United States Patent
Baldwin et al.

(10) Patent No.: US 7,613,106 B2
(45) Date of Patent: Nov. 3, 2009

(54) DIAL PLAN TRANSPARENCY FOR FRAGMENTED NETWORKS

(75) Inventors: Christopher D. Baldwin, Princeton, NJ (US); Donald E. Gillespie, Boulder, CO (US); Pamela G. McGovern, Middletown, NJ (US); Albert D. Pessot, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 720 days.

(21) Appl. No.: 11/230,355

(22) Filed: Sep. 19, 2005

(65) Prior Publication Data

US 2006/0168326 A1 Jul. 27, 2006

Related U.S. Application Data

(60) Provisional application No. 60/641,629, filed on Jan. 4, 2005.

(51) Int. Cl.
*G01R 31/08* (2006.01)
(52) U.S. Cl. ............... 370/218; 370/217; 370/221; 370/401
(58) Field of Classification Search ............... None
See application file for complete search history.

(56) References Cited

U.S. PATENT DOCUMENTS

| | | | |
|---|---|---|---|
| 5,206,903 A | 4/1993 | Kohler et al. | |
| 5,280,561 A | 1/1994 | Satoh et al. | |
| 5,442,696 A | 8/1995 | Lindberg et al. | |
| 5,828,747 A | 10/1998 | Fisher et al. | |
| 5,905,793 A | 5/1999 | Flockhart et al. | |
| 5,974,114 A | 10/1999 | Blum et al. | |

(Continued)

FOREIGN PATENT DOCUMENTS

EP 0805576 A2 11/1997

(Continued)

OTHER PUBLICATIONS

U.S. Appl. No. 11/231,203, filed Sep. 19, 2005, Baldwin.

(Continued)

*Primary Examiner*—Jayanti K Patel
*Assistant Examiner*—Anthony Sol
(74) *Attorney, Agent, or Firm*—Sheridan Ross P.C.

(57) ABSTRACT

In one configuration, the present invention is directed to an enterprise network that includes geographically dislocated first and second network regions 202 and 206 communicating with one another through first and second networks 252 and 248 and respectively comprising first and second gateways 220 and 224 and first and second groupings of trunks. A common electronic address is associated with the second grouping of trunks. A media server 200 is positioned in the first network region 202 that includes an inter-gateway routing agent 260. The first network region transmits, as part of the establishment of a real-time or near real-time communication between first and second subscribers respectively in the first and second network regions, the common address to the second gateway 224. After the outgoing communication is answered by the second gateway 224, the first network region transmits in band to the second gateway 224 a user identifier associated with the second subscriber and/or a phantom user. The user identifier is used to establish the communication with the second subscriber.

35 Claims, 6 Drawing Sheets

U.S. PATENT DOCUMENTS

| | | | |
|---|---|---|---|
| 5,982,873 | A | 11/1999 | Flockhart et al. |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,282,192 | B1 | 8/2001 | Murphy et al. |
| 6,292,463 | B1 | 9/2001 | Burns et al. |
| 6,314,114 | B1 | 11/2001 | Coyle et al. |
| 6,411,705 | B2 | 6/2002 | Oran et al. |
| 6,434,226 | B1 | 8/2002 | Takahashi |
| 6,504,922 | B1 | 1/2003 | Erb |
| 6,574,469 | B1 | 6/2003 | Xiang et al. |
| 6,665,375 | B1 | 12/2003 | Forlenza et al. |
| 6,671,262 | B1 | 12/2003 | Kung et al. |
| 6,721,712 | B1 | 4/2004 | Benyassine et al. |
| 6,731,734 | B1 | 5/2004 | Shaffer et al. |
| 6,738,343 | B1 | 5/2004 | Shaffer et al. |
| 6,801,612 | B2 | 10/2004 | Malcolm et al. |
| 6,925,076 | B1 | 8/2005 | Dalgic et al. |
| 6,937,873 | B2 | 8/2005 | Levy et al. |
| 6,950,874 | B2 | 9/2005 | Chang et al. |
| 6,968,382 | B2 | 11/2005 | McBrearty et al. |
| 6,973,506 | B2 | 12/2005 | Ishiyama et al. |
| 6,999,478 | B2 | 2/2006 | D'Angelo |
| 7,145,900 | B2 | 12/2006 | Nix et al. |
| 7,161,897 | B1 | 1/2007 | Davies et al. |
| 7,215,643 | B2 * | 5/2007 | Mussman et al. ........... 370/237 |
| 7,227,927 | B1 | 6/2007 | Benedyk et al. |
| 7,243,142 | B2 | 7/2007 | Poirot et al. |
| 2003/0031137 | A1 | 2/2003 | Mecklin Tomas |
| 2003/0091024 | A1* | 5/2003 | Stumer ....................... 370/352 |
| 2004/0028199 | A1 | 2/2004 | Carlson |
| 2004/0101119 | A1 | 5/2004 | Malcolm et al. |
| 2004/0143665 | A1 | 7/2004 | Mace et al. |
| 2004/0252676 | A1 | 12/2004 | Bye |
| 2005/0018659 | A1* | 1/2005 | Gallant et al. ............... 370/352 |
| 2005/0021849 | A1 | 1/2005 | Hipfinger |
| 2005/0068889 | A1 | 3/2005 | Chavez et al. |
| 2005/0281216 | A1 | 12/2005 | Varonen et al. |
| 2006/0034297 | A1 | 2/2006 | O'Neill |
| 2006/0067274 | A1 | 3/2006 | Gillespie et al. |
| 2006/0092919 | A1 | 5/2006 | Hallmark et al. |
| 2006/0146737 | A1 | 7/2006 | Sandgren et al. |
| 2006/0146799 | A1 | 7/2006 | Baldwin et al. |
| 2006/0146802 | A1 | 7/2006 | Baldwin |
| 2006/0146859 | A1 | 7/2006 | Baldwin et al. |
| 2006/0168326 | A1 | 7/2006 | Baldwin et al. |
| 2008/0049770 | A1 | 2/2008 | Gillespie et al. |

FOREIGN PATENT DOCUMENTS

| | | |
|---|---|---|
| EP | 0920176 A2 | 6/1999 |
| EP | 0964563 | 12/1999 |
| EP | 1091550 | 4/2001 |
| EP | 1250023 A1 | 10/2002 |
| EP | 1677569 A1 | 7/2006 |
| EP | 1677570 A1 | 7/2006 |
| JP | S58-170272 | 10/1983 |
| JP | H04-245793 | 9/1992 |
| JP | H06-86338 | 3/1994 |
| JP | 08-065340 | 3/1996 |
| JP | H8-320800 | 12/1996 |
| JP | H10-164240 | 6/1998 |
| JP | 10-224408 | 8/1998 |
| JP | H10-214240 | 8/1998 |
| JP | H11-331153 | 11/1999 |
| JP | 2000-174824 | 6/2000 |
| JP | 2000-174825 | 6/2000 |
| JP | 2001-156786 | 6/2001 |
| JP | 2001-196165 | 7/2001 |
| JP | 2002-522962 | 7/2002 |
| JP | 2002-237896 | 8/2002 |
| JP | 2002-247187 | 8/2002 |
| JP | 2002-305588 | 10/2002 |
| JP | 2003-101669 | 4/2003 |
| JP | 2003-514439 | 4/2003 |
| JP | 2003-244204 | 8/2003 |
| JP | 2004-186766 | 7/2004 |
| JP | 2005-39565 | 2/2005 |
| JP | 2005-512397 | 4/2005 |
| WO | WO 00/72536 | 11/2000 |
| WO | WO 00/72560 A1 | 11/2000 |
| WO | WO 01/65808 | 9/2001 |
| WO | WO 01/69858 | 9/2001 |

OTHER PUBLICATIONS

Background for the above-captioned application (previously provided).

United Kingdom search report for GB counterpart application, Application No. 0616991.6.

U.S. Appl. No. 11/080,763, filed Mar. 14, 2005, Coughlan et al.

M. Bozinovski et al., "Fault-tolerant SIP-based call control system," Electronics Letters, vol. 39, No. 2 (Jan. 23, 2003), pp. 254-256, XP006019695 ISSN: 0013-5194.

ITU-T Recommendation H.248, "Series H: Audiovisual and Multimedia Systems," International Telecommunication Union (Jun. 2000), pp. 1-121.

Kristol and Montulli, "HTTP State Management Mechanism," Oct. 2000, pp. 1-22, available at http://www.cse.ohio-state.edu/cgi-bin/rfc/rfc2965.html, printed Feb. 3, 2005.

Clark, William J.; "Multipoint Multimedia Conferencing"; IEEE Communications Magazine; May 1992; pp. 44-50.

"Separation of Bearer and Signaling for Avaya™ Communication Manager," Avaya, Issue 1 (May 2003) pp. 1-42.

Declaration of Michael Gruen Under 37 CFR Section 1.98; 3 pages.

Cisco Systems Overview—Cisco IOS Telephony Services: Survival Remote Site Telephony, "Now Cost-Effectively Extend Cisco CallManager IP Telephony and High Productivity Applications to Small Branch Office Sites" Copyright 2001, Cisco Systems, Inc., pp. 1-4.

Cisco Systems Solutions Guide—"Survivable Remote Site Telephony Cisco 2600/3600 Voice Technical Marketing" Copyright 1992-2001, Cisco Systems, Inc., pp. 1-19.

Cisco Systems IOS Release 12.2(8)T—Survivable Remote Site Telephony, pp. 1-74 (undated).

Cisco Solutions Guide—"Survivable Remote Site Telephony Cisco 2600/3600 Voice Technical Marketing" Copyright 1992-2001, Cisco Systems, Inc., http://www.cicso.com/warp/public/cc/pd/unco/srstl/tech/demha_sg.htm (21 pages).

Cisco Systems—Survivable Remote Site IP Telephony, Copyright 1992-2003, Cisco Systems, Inc., http://www.cisco.com/warp/public/cc/pd/unco/srstl, 1 page.

Cisco Systems White Paper—"Ensuring IP Telephony High Availability in the Branch Office, Now Cost-effectively Extend Cisco CallManager IP Telephony to Small Branch Office Sites Using Cisco Survivable Remote Site Telephony" Copyright 1992-2005, Cisco Systems, Inc., http://www.cisco.comlen/us/products/sw/voicesw/ps2169/products_white_paper09186a008...(5 pages).

Cisco IP Telephony Solution Reference Network Design, Dial Plan, #9562230403, Chapter 8, pp. 1-70 (undated).

Lucent Technologies Merlin Legend Communications System, Release 6.1, Network Reference, 555-661-150 Comcode 108289703; Issue 1, Aug. 1998; 369 pages.

Carroll Communications, Inc. Automatic Route Selection (ARS) Feature, at http://www.carrollcommunicattions.com/merlinmagix/AutomaticRouteSelection.html, 2 pages.

KXTD System—ISDN—Basic and Primary Rate Interfaces, at http://www.thetelephoneexchange.co.uk/Teleweb_files/kxtd.html, 5 pages.

Definition—automatic route selection (ARS) at http://www.atisorg/tg2k/automatic_selection_route.html, 1 page.

Acronym Finder—ARS at http://www.auditmypc.com/acronym/ARS.asp, 2 pages.

WestNet Learning—glossary for UDP, at http://glossary.westnet.com/term.php?termId=2213, 1 page.

Notification of the First Office Action (including translation) for Chinese Patent Application No. 200610138827.4, mailed Mar. 20, 2009.

Examiner's Office Letter (including translation) for Japanese Patent Application No. 2006-252187, mailed May 7, 2009.

Official Action for Canadian Patent Application No. 2558283, mailed May 14, 2009.

Official Letter (including translation) for German Patent Application No. 10 2006 042528.6-31, mailed May 29, 2009.

* cited by examiner

DIAL PLAN TRANSPARENCY FOR FRAGMENTED NETWORKS

CROSS REFERENCE TO RELATED APPLICATION

This application claims the benefits under 35 U.S.C. § 119 of U.S. Provisional Patent Application Ser. No. 60/641,629, filed Jan. 4, 2005, of the same title and to the same inventors, which is incorporated herein by this reference.

Cross reference is made to U.S. patent application Ser. Nos. 11/107,659, filed Apr. 14. 2005, and entitled "IN-BAND CALL ASSOCIATION SIGNALING FOR A SINGLE NUMBER DESTINATION" and Ser. No. 11/107,524, filed Apr. 14, 2005, and entitled "ALTERNATE ROUTING OF MEDIA CONNECTIONS WITHIN A SINGLE COMMUNICATIONS SYSTEM ACROSS PUBLIC OR PRIVATE NETWORK FACILITIES", each of which is incorporated herein by this reference.

FIELD

The invention relates generally to converged communications networks and particularly to alternate communication paths for voice communications.

BACKGROUND

IP networks generally provide an excellent infrastructure for geographically distributing components of a telecommunication system. The underlying IP network is optimal for transmission for control signaling, and, when bandwidth is available, can provide an acceptable Quality of Service (or QoS) or Grade of Service (or GOS) for voice communications. When insufficient network resources are available for voice communications or one or more IP network components are down, voice communications can be adversely impacted.

For example, assume an enterprise network having first and second network regions, with each network region being served by a different media gateway and survivable media server. The primary media server controls the media gateways in a first operational mode. When the WAN is available, a subscriber in the first network region can dial any other subscriber in the first and second network regions simply by dialing that subscriber's extension. In the event of a network failure that causes the primary server to lose control of both of the survivable media servers, the media gateway in the first network region will register with the first survivable media server, and the second media gateway in the second network region will register with the second survivable media server. This is the second operational mode. As a result, a subscriber in one network region is unable to dial directly the extension of a subscriber in another network region. Even though each survivable media server is aware of all of the endpoints in the enterprise network, each media server controls only the endpoints in its respective network region.

A number of techniques have been attempted to address these issues.

In one technique, when a system has multiple communication gateways controlled by a single controller and the private switching facilities inter-connecting these gateways failed, users can "dial-out" on a public network trunk using the public address (or the Direct Inward Dial or DID number) of the destination party. A calling subscriber can dial a PSTN access code, followed by a complete public network number to reach the called subscriber. By way of illustration, instead of dialing a five-digit extension (83594) to reach a telephone in another branch office, a subscriber must dial 9-303-538-3594 during a network failure. This approach requires manual intervention by the user first to recognize that a problem exists, second to determine how to circumvent it, and third to dial the DID number. If the destination party to be reached does not have a public number, he or she cannot be reached directly by the alternate network. In particular, subscribers without a DID number cannot be reached by dialing PSTN numbers without an intervening auto-attendant. Moreover, though some subscribers may be permitted to make and receive extension-dialed calls, they may have restrictions that prevent them from placing or receiving PSTN calls. Finally, no feature transparency is available since calls appear as simple incoming and/or outgoing PSTN calls.

Another technique for managing IP bandwidth usage includes call admission control in which the number of calls across the Wide Area Network or WAN or the bandwidth available for voice calls is limited. Call admission control can result in the call being denied and being forwarded to the callee's voice mail server (if accessible), thereby causing caller frustration.

In yet another technique known as PSTN Fallback™ of Avaya Inc., a call is forced to the PSTN when an IP trunk connection experiences an unacceptable QoS or GOS. With reference to FIG. 1, a multi-enterprise architecture is depicted, each enterprise 100 and 104 having a separate, independent, and active or primary media servers 112 and 116 with resident call controller functionality. Each enterprise also includes a plurality of digital stations 120 and 124, a plurality of IP or Internet Protocol stations 128 and 132, a gateway 136 and 140 and a Local Area Network or LAN 144 and 148. The media servers 112 and 116 are independent in that one media server in one enterprise is generally unaware of the subscriber configuration information, such as extensions, of the other enterprise's subscribers. The gateways 136 and 140 are interconnected by the Public Switched Telephone Network or PSTN 148 and Wide Area Network or WAN 152. When a call is to be placed over the WAN 152, the originating call controller determines the currently measured network delay and packet loss. When either measured variable reaches a predetermined threshold, the call controller automatically takes the idle IP trunk ports out-of-service, i.e., it busies out the ports. The ports remain out-of-service until the measurements return to the low threshold. No new calls are allowed over the IP trunk. Normal or conventional call routing over the PSTN 148 is used for access to the next preference in the route pattern.

In a further technique known as Separation of Bearer and Signaling™ (SBS) of Avaya Inc., the signaling channel for a call is routed over the WAN 152 while the bearer channel is routed over the PSTN 148. The signaling channel in SBS includes SBS call-control signaling and QSIG private-networking protocol information. SBS associates the signaling and bearer channels at the SBS originating and terminating nodes so that they appear to the end users to be a normal, non-separated call. The use of the WAN for signaling traffic and the PSTN for voice bearer traffic addresses a customer need for using small amounts of bandwidth in the IP WAN for signaling traffic, with the voice bearer portion of the call being sent over inexpensive PSTN facilities. Like PSTN Fallback, SBS™ is used in multi-enterprise calls with each enterprise having separate, independent, and active media servers.

PSTN Fallback™ and SBS™ address architectures where there exist multiple, separate system implementations interconnected by a traditional inter-switch trunking protocol; in other words, they permit inter-connection only of peer-topeer systems. With the move to larger, single-server IP WAN-connected media gateway distributed systems, there is no longer a need for IP trunks and SBS. Using trunk group administration to limit bandwidth between media servers is not required nor is PSTN Fallback™ when the number of calls exceeds the administered IP trunk member limit. There is no need to embed an intelligent signaling interface between servers over IP WAN facilities given that the system has only a single active or primary server and that all calls across the system appear to be station-to-station calls.

Another technique known as the Survivable Remote Site Telephony™ (SRS Telephony) by Cisco Systems, Inc., involves a primary server (such as CallManager™ by Cisco Systems, Inc.) controlling a plurality of interconnected sub-networks. Each subnetwork includes an IP telephony router and media gateway and is connected to other subnetworks by a WAN and the PSTN. In the event of a WAN link failure resulting in a loss of control by the primary server, SRS Telephony automatically detects the network failure and initiates a process to intelligently auto-configure the router to provide call processing redundancy for the IP phones in that network subnetwork. Link failure is detected by the IP telephones when they are no longer receiving keepalive packets from the primary server. In response, each of the IP telephones registers with the router, which queries the telephone about its configuration and then auto-configures itself. The SRS Telephony software, which is resident in the IP telephony router, is automatically activated and builds a local database of all IP telephones attached to it. When the WAN link is restored, the IP telephones detect keepalive packets from the primary server and revert to it for primary call setup and processing. This configuration, however, is only a partial solution. It is applicable only to IP phones and not to other types of communication devices, such as digital phones. Although IP telephones in each impacted subnetwork are able to call one another using extension dialing (which is typically five or fewer digits) by virtue of the call processing functionality of the local IP telephony router, they are unable to use extension dialing to call IP telephones in other subnetworks of the enterprise network. To make such calls, IP telephone users must still dial the full PSTN number (which is typically seven or more digits). Moreover, automatic feature transparency is not provided in the SRS Telephony product.

There is a need, particularly in a single-server system, for a call control system that manages IP bandwidth usage effectively, particularly during high traffic periods and/or provides an alternate communication path in the event of problems with the WAN.

SUMMARY

These and other needs are addressed by the various embodiments and configurations of the present invention. The present invention is directed generally to the establishment of public or private network (that are normally not owned or managed by the enterprise communications controller) inter-gateway connections, particularly via trunks, for a community of users/subscribers, commonly using a generic or common address for the community. As used herein, "gateway" refers not only to gateways but also to devices providing similar functionality, such as port networks.

In one embodiment, an enterprise network has geographically dislocated first and second network regions. The first and second network regions are in communication with one another through first and second intermediate networks and respectively include first and second gateways and a number of communication devices. In a first operational mode, the first and second network regions are controlled by a common media server and most, if not all, bearer channels for real time and/or near real-time (e.g., live voice) communications are routed over the first intermediate network. In a second operational mode, the first and second network regions are not controlled by a common media server. In this enterprise network, the embodiment of the present invention includes the steps of:

(a) the first network region receiving, from a first communication device of a first subscriber located in the first network region, a request to initiate a real time or near real-time communication with a second communication device of a second subscriber located in the second network region, the request including a called electronic address (such as an abbreviated dial string) identifying the second communication device;

(b) the first network region determining that the enterprise network is in the second operational mode; and (c) routing the real-time or near real-time communication over the second intermediate network. In one configuration, the first and second network regions include respectively first and second groupings of trunks connected to the first networks. A common electronic address (e.g., telephone number) is associated with the second grouping of trunks. The first network region transmits the common electronic address to the second network region in an outgoing communication. After the outgoing communication is answered by the second network region, the first network region transmits over a bearer path for the session to the second network region an identifier. The identifier is commonly unique relative to other identifiers transmitted by the call controller during a selected period of time. By way of example, the identifier may be a user identifier that is associated with the second subscriber and/or an unrelated phantom user, a service record identifier, a port identifier, a random or pseudorandom number, and the like. The identifier is used to direct the communication to the second subscriber. The "communication" may be any real-time or near real-time communication, such as a wireline or wireless live voice call, an instant messaging session, a Short Message Service or SMS session, chat session, and the like.

The first and second networks may be connection-oriented or connectionless and wireline or wireless. The first and second networks are commonly discrete from and independent of one another in that they employ different protocols and/or switching mechanisms for the same type of communication, e.g., for live voice communications. In one preferred configuration, the first network is circuit-switched and the second network is packet-switched.

In the embodiment, communities of users can be connected using a number of electronic addresses that is less than the numbers of members in each community. For example given two communities of users A1-An and B1-Bn, a connection can be made from any user Ai to any user Bj using the PSTN and a common telephone number. The connection typically requires no action or assistance from Ai or Bj and removes the need for the trunk call to access an attendant, either manual or automated.

The present invention can have a number of advantages depending on the application. For example, the invention can seamlessly and automatically detect network component failure and, in response, route the outbound communication or contact over a different network, typically the PSTN. In this way, the user is often unaware of the network failure. The invention can allow subscribers to perform abbreviated extension dialing during WAN failure and still reach subscribers in other network fragments. During WAN outages, the invention permits subscribers to be contacted who do not have DID access. Such calling functionality can be supported without extra coverage path administration and without the security risks of remote access or the additional feature cost of vectoring with prompting. The invention can permit selected features, such as caller identification, reason codes, distinctive ringing, and call coverage information, to be in-band signaled between the calling and called network regions. Such signaling can provide subscribers with desired functionality and services. Voice mail coverage can be provided without extra coverage path administration. Feature transparency can thus be made available to subscribers in the event of a network outage. For these and other reasons, the invention can provide increased levels of network reliability and user satisfaction and convenience.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The General Architecture

Figure 1:
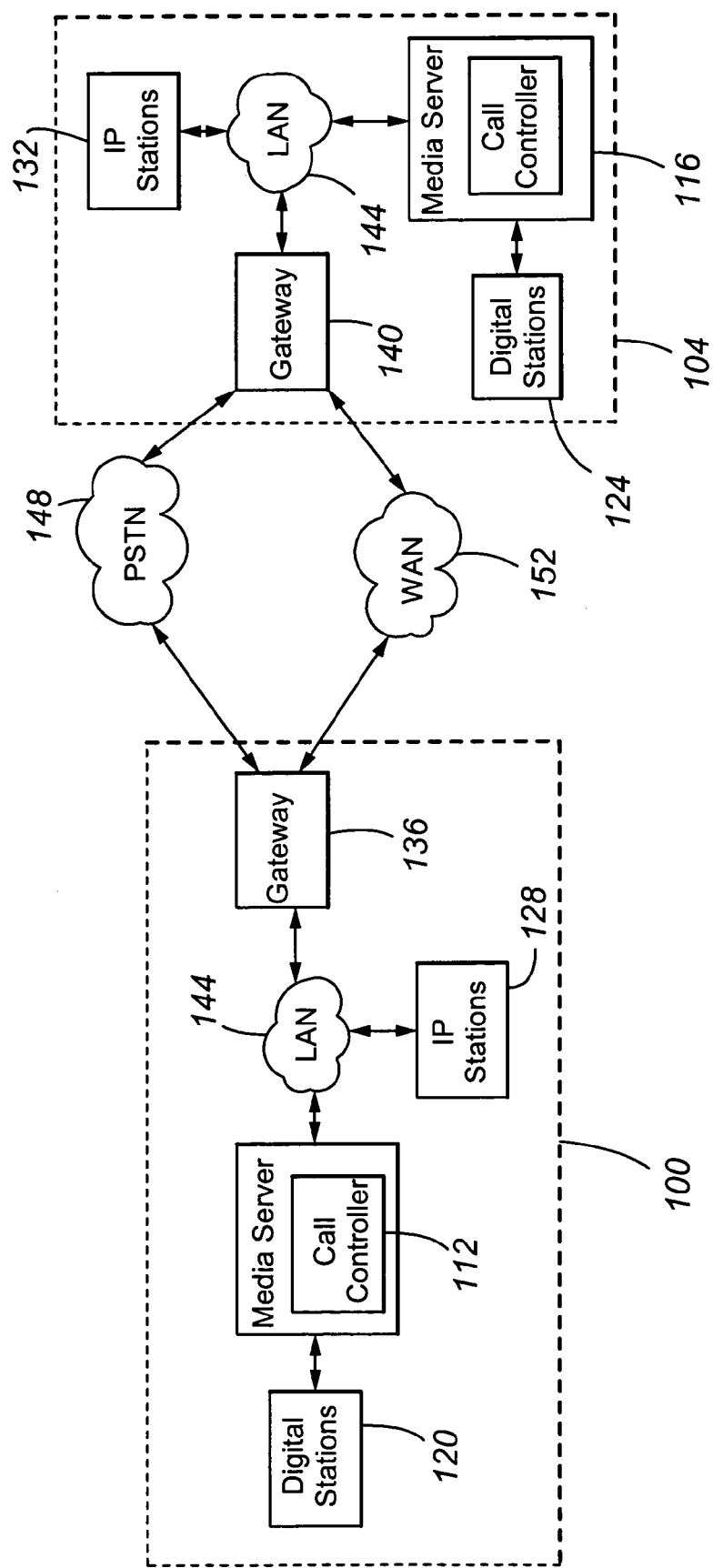
FIG. 1 is a prior art call control architecture.
Figure 2:
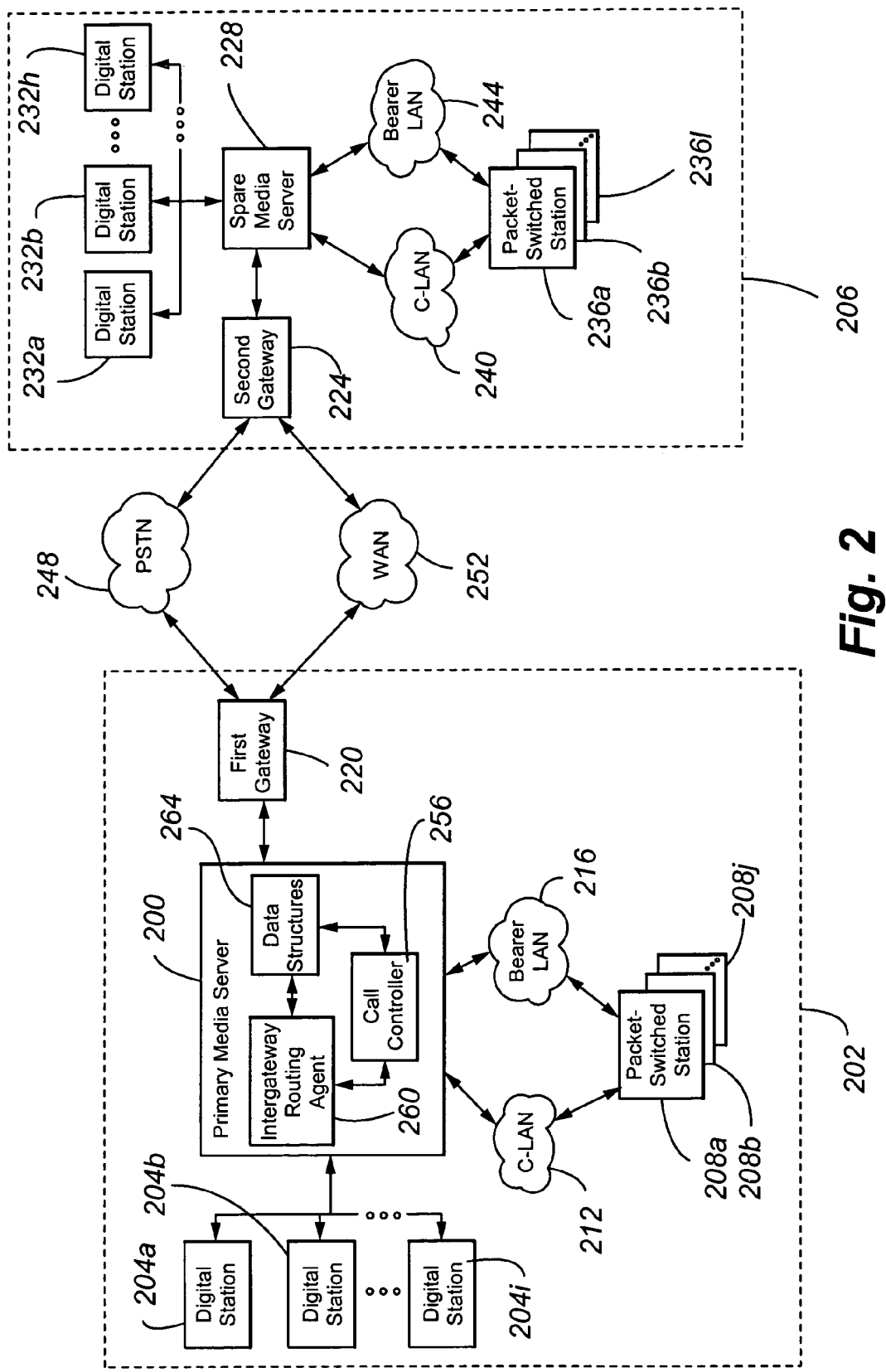
FIG. 2 is a block diagram according to an embodiment of the present invention.

FIG. 2 depicts an architecture according to an embodiment of the present invention. The architecture is in a single enterprise network having geographically dislocated first and second regions 202 and 206. The first region 202 includes a primary or active media server 200 connected to a plurality of subscriber digital stations 204a-i and a plurality of subscriber IP stations 208a-j via Control LAN or C-LAN 212 and bearer LAN 216, and first gateway 220. The second region 206 includes a spare or secondary media server 228 connected to a plurality of subscriber digital stations 232a-k and a plurality of subscriber packet-switched stations 236a-l via C-LAN 240 and bearer LAN 244 and a second gateway 224. The first and second gateways 220 and 224 are interconnected via the PSTN 248 and a WAN 252.

Each of the subscriber digital stations and packet-switched stations can be one or more wireline or wireless packet-switched and/or circuit-switched communication devices, respectively. For example, the digital stations can be digital telephones such as Digital Communications Protocol or DCP phones, Integrated Digital Services (ISDN) endpoints (BRI and PRI terminal equipment including telephones and video endpoints), voice messaging and response units, traditional computer telephony adjuncts, and wired and wireless circuit-switched telephones, and the packet-switched stations can be any packet-switched communication device, such as Avaya Inc.'s IP phones such as 4600 Series IP Phones™, IP softphones such as Avaya Inc.'s, IP Softphone™, Personal Digital Assistants or PDAs, Personal Computers or PCs, laptops, and H.320 video phones and conferencing units.

Each of the first and second gateways is an electronic signal repeater and protocol converter that commonly provides a telephone exchange service, supporting the connection of the various types of stations and outside packet-switched and/or circuit-switched telephone lines (such as analog trunks, ISDN lines, E1/T1 voice trunks, and WAN route IP trunks). Telephone lines are typically connected to the gateway via ports and media modules on the chassis, with different media modules providing access ports for different types of stations and lines. Voice and signaling data between packet-switched and circuit-switched protocols is normally effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, call admission control, and a media processor, and one or more IP server interfaces. Examples of gateways include Avaya Inc.'s SCC1™, MCC1™, CMC™, G350™, G600™, G650™, and G700™.

The C-LANs 212 and 240, bearer LANs 216 and 244, and WAN 252 are packet-switched and may employ any suitable protocol, such as the TCP/IP suite of protocols, the Ethernet protocol, the Session Initiation Protocol or SIP, and/or the H.323 protocol.

The primary and spare media servers controlling the gateways can be any converged architecture for directing circuit-switched and/or packet-switched customer contacts to one or more stations. As will be appreciated, the primary media server normally controls the first and second gateways. In the event of a loss of communication with the second gateway, such as through a catastrophic WAN failure, the spare media server becomes active and takes over control of the second gateway 224. A loss of control or connectivity is typically determined by a heartbeat or polling mechanism between the primary server 200 on the one hand and the spare media server 228, second gateway 224, and/or stations 232 and 236 on the other. When the heartbeat or polling mechanism fails, a network component failure is assumed to have occurred. Commonly, the media servers are stored-program-controlled systems that conventionally include interfaces to external communication links, a communications switching fabric, service circuits (e.g., tone detectors and generators, announcement circuits, etc.), memory for storing control programs and data, and a processor (i.e., a computer) for executing the stored control programs to control the interfaces and the fabric and to provide automatic contact-distribution functionality. Illustratively, the media servers can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private- Branch Exchange (PBX)-based ACD system; Avaya Inc.'s IP600™ LAN-based ACD system, or an S8100™, S8300™, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

Bandwidth Management

Each of the primary and spare media servers 200 and 228 include call controller functionality 256, an inter-gateway routing agent 260, and call-related data structures 264. Call controller 256 performs call control operations, such as call admission control, progressive call control, and originating call control, and the inter-gateway routing agent alternately routes calls (referred to as (Inter-Gateway Alternate Route or IGAR calls) over circuit-switched trunks (e.g., public or private ISDN PRI/BRI trunks and R2MFC trunks) in the PSTN 248 when the WAN 252 is determined to be incapable of carrying the bearer connection. The WAN may be determined to be incapable of carrying the bearer connection when one or more of the following is true: a desired QoS and/or GOS for a communication is not currently available using the WAN, the communication may not be effected using the WAN, a system configuration precludes or impedes the use of the WAN for selected type of communication, a would-be contactor does not desire to use the WAN for the communication, and the like. The WAN 252 is typically determined to be incapable when the number of calls or bandwidth (e.g., Kbits/sec or Mbits/sec on a packet-switched station, trunk, and/or media gateway and/or an explicit number of connections) allocated via call admission control (or bandwidth limits) has been reached, Voice over IP or VoIP resource (e.g., RTP resource) exhaustion in the first and/or second gateway occurs, a codec set between a network region pair is not specified, forced redirection between a pair of network regions is in effect, and/or when control of the second gateway 224 is lost by the primary media server (e.g., when the packet-switched WAN 252 has a catastrophic failure thereby resulting in partitioning of the network with each region 202 and 206 having an active media server or when the primary server 200 itself fails). The agent can preserve the internal makeup of the IGAR call between a pair of gateways in separate port network regions even though the voice bearer portion of the IGAR call is rerouted over alternative PSTN facilities. In this manner, the agent 260 can provide desired levels of QoS and/or GOS to large distributed single-server telecommunications networks having numerous branch offices and distributed call centers.

Call controller functionality can include one or more routing tables for incoming and outgoing calls. As will be appreciated, calls that originate and terminate on the same enterprise network are considered to be on-network (or on-net), and calls that originate in one enterprise network and terminate in a different enterprise network are considered to be off-network (or off-net). A uniform on-net dial plan maps dialed extension ranges against DID ranges and maps each extension to a unique location (or gateway). The extension number(s) assigned to each subscriber is unique within a site and often within the enterprise network. A uniform dial plan is designed so that all extensions within the enterprise are reached in a uniform way (e.g., a fixed quantity of digits are used to reach a given extension from any on-net originating station). A variable length on-net dial plan is frequently used for enterprises having many geographically distributed sites or branches that retain the use of abbreviated dialing for calls to on-net extensions within a site and use an access code (which is typically one digit) followed by a site code (which may be one or more digits depending on the number of discrete sites and/or may have a one-to-one correspondence to a gateway in the enterprise network) and the destination station's on-net extension for calls between sites. As will be appreciated, both uniform and variable length dial plans may be used for geographically distributed or single sites.

As will be appreciated, an IGAR call may be routed over the PSTN for reasons other than a call between subscribers. For example, a station in one network region can bridge onto a call appearance of a station in another network region, an incoming trunk in one network region can be routed to a hunt group with agents in another network region, and an announcement or music source from one network region must be played to a party in another network region. In one configuration, each network region is assigned one or more unique DID numbers (also referred to as an IGAR Listed Directory Number or LDN) that is dialed during set up of the call over the PSTN facilities. The IGAR LDN is a group-type number that is able to answer multiple calls and assign each call to a phantom IGAR user (that is commonly unrelated to the caller and callee). The LDN acts as a single DID number that may be dialed to reach any member of a set of subscribers located in a selected network region. This configuration in essence provides "virtual receptionist" or auto attendant that can direct a call without requiring the caller to dial a discrete DID number for each user. Typically, Automatic Route Selection or ARS or Automatic Alternate Routing or AAR is used to route a trunk (IGAR) call from one network region to the LDN extension administered for the other network region. As will be appreciated, ARS automatically and dynamically routes outgoing calls over a selected route or path, normally after dialing an ARS access code. AAR establishes an alternate path for the call when a specified set of conditions are found to be in existence. AAR is typically configured so that subscribers dial an access code followed by the on-net directory number or extension of the called station and no additional subscriber input is required to reach the destination station through the alternate network (e.g., the PSTN). By way of illustration when a first subscriber in a first network region calls a second subscriber's station located in a second network region and when the second network region is under the control of a second media server and the first network region is under the control of a first media server, the first media server selects the LDN extension of the second network region and places the call to that extension rather than to the extension of the second subscriber's station. In this manner, the gateway receiving an incoming IGAR call can determine, from the collected digits, that the call is directed to the LDN extension corresponding to the second network region.

In one configuration, when an IGAR call or feature invocation is terminated the agent 260 caches the IGAR trunk connection for a specified time period and/or until a predetermined event ends (such as service being restored in the WAN or bandwidth and/or VoIP resources becoming available). Caching provides an available in the event that the connection is needed for a later call between the same or different subscribers. Setting up a trunk inter-gateway connection is costly in terms of user-perceived call setup time, typically requiring at least several seconds to complete. Caching can provide a new trunk inter-gateway connection immediately, thereby eliminating the observable delays as perceived by the caller. When the time period expires and/or the specified event ends, the cached trunk inter-gateway connection may be dropped, with the outgoing and incoming trunks again becoming available for normal calls.

A trunk inter-gateway connection is commonly selected from the cache when at least one of the two trunks defining the inter-gateway connection is selected such as by ARS routing as noted above, and the other end of the trunk inter-gateway connection terminates in the desired far-end network region. If a trunk is needed between two network regions and no trunk is currently available due to a network region maximum trunk limit being exceeded and if a trunk inter-gateway between that network region and another network region is available in the cache, the cached trunk inter-gateway connection may be dropped and the newly available outgoing trunk used to set up the trunk inter-gateway connection.

To minimize the impact on users of the length of time required to set up a trunk inter-gateway connection, the called party is commonly not alerted (e.g., no flashing lamps, no display updates, and no ringing) until the trunk call is active (i.e., answered, verified, and cut through). The calling party hears ringback tone immediately and, if the trunk inter-gateway connection takes longer to set up than the administered number of rings for local coverage, the call may proceed to the first coverage point.

Figure 3A:
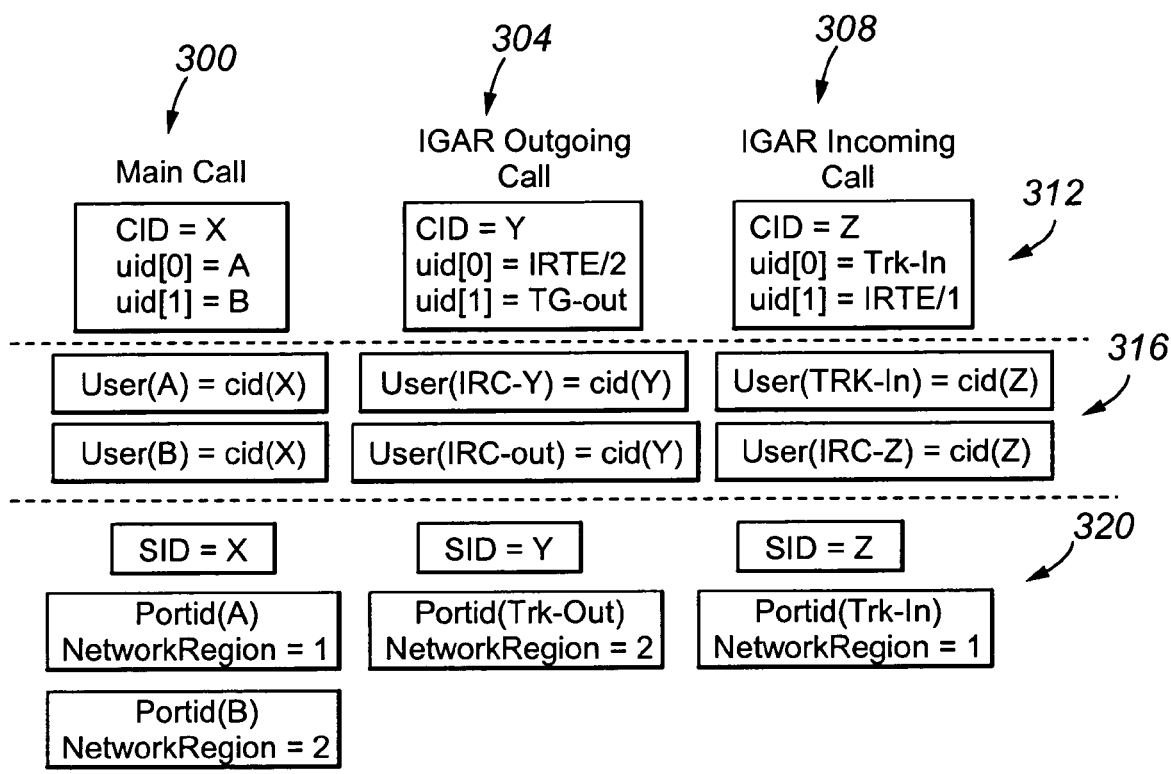
FIG. 3A is a block diagram of the data structures associated with an Inter-gateway Alternate Route or IGAR bandwidth management call.

FIG. 3A depicts the data structures 264 for the various call components in an IGAR bandwidth management call. The call components include the main or original call 300 dialed by the subscriber, the IGAR outgoing call 304 using a phantom IGAR user (that is unrelated to the caller) as the originator, and the IGAR incoming call 308 using a different phantom IGAR user (that is unrelated to the callee) as the destination. In the example of FIG. 3A, "CID" or "cid" refers to call identifier, "uid" to user identifier, "SID" to service identifier, and "Portid" to port identifier. As will be appreciated, the call, user, and service identifiers can be any numerical, alphabetical, or alphanumerical variable or collection of variables that is unique with respect to other identifiers of the same type. With reference to the variables of FIG. 3A, "A" is an identifier of the call originator in the first network region 202, "B" is an identifier of the callee in the second network region 206, "X" is the call identifier for the main call (dialed by subscriber A), "Y" is the call identifier for the outgoing IGAR call from the phantom IGAR user "IRTE/2" at the first gateway to the outgoing trunk "TG-out" extending from the first gateway, "Z" is the call identifier for the incoming IGAR call from the phantom IGAR user "IRTE/1" at the second gateway to the incoming trunk "Trk-In" into the first gateway, "Portid(A)" refers to the port identifier corresponding to A's respective station in the first network region, "Portid(B)" refers to the port identifier corresponding to B's respective station in the second network region, "NetworkRegion=1" refers to the first network region, "NetworkRegion=2" refers to the second network region, "Portid(Trk-Out)" is the port identifier corresponding to the outgoing trunk in the first network region, and "Portid(Trk-In)" is the port identifier corresponding to the incoming trunk in the second network region. The upper level 312 depicts the data structures maintained at the call processing layer; the middle level 316 to the data structures maintained at the user layer; and the lower level 320 to the data structures maintained at the connection layer. The main call data structures are completed by the agent 260 after in-band signaling is provided by the first gateway to the second gateway as described below with reference to FIGS. 4 and 5.

Network Fragmentation

In one configuration, there are two types of IGAR calls, namely an IGAR bandwidth management call and an IGAR network fragmentation call. An IGAR bandwidth management call is placed when the number of calls or bandwidth allocated via call admission control (or bandwidth limits) has been reached, Voice over IP or VoIP resource exhaustion in the first and/or second gateway is encountered, a codec set between a network region pair is not specified, and forced redirection between a pair of network regions is in effect. In an IGAR bandwidth management call, the bearer path or channel for the call is routed over the PSTN 248 and the signaling channel over the WAN 252. An IGAR network fragmentation call is placed when the primary media server loses control of the second gateway 224. As will be appreciated, when network fragmentation or partitioning occurs, the second gateway becomes unregistered and the spare media server 228 assumes control of the second gateway 224. Because the WAN is unavailable, both the bearer and signaling channels of the IGAR call are routed over the PSTN 248. The primary difference between IGAR bandwidth management and network fragmentation calls is that in the former case a common primary media server controls both media servers in the calling and called network regions while in the latter case separate servers, whether primary and/or spare, control the media servers. While the set up direction of the IGAR bandwidth management call is arbitrary, the IGAR network fragmentation call, due to the involvement of multiple servers, is normally set up from the calling to the called subscriber.

Figure 3B:
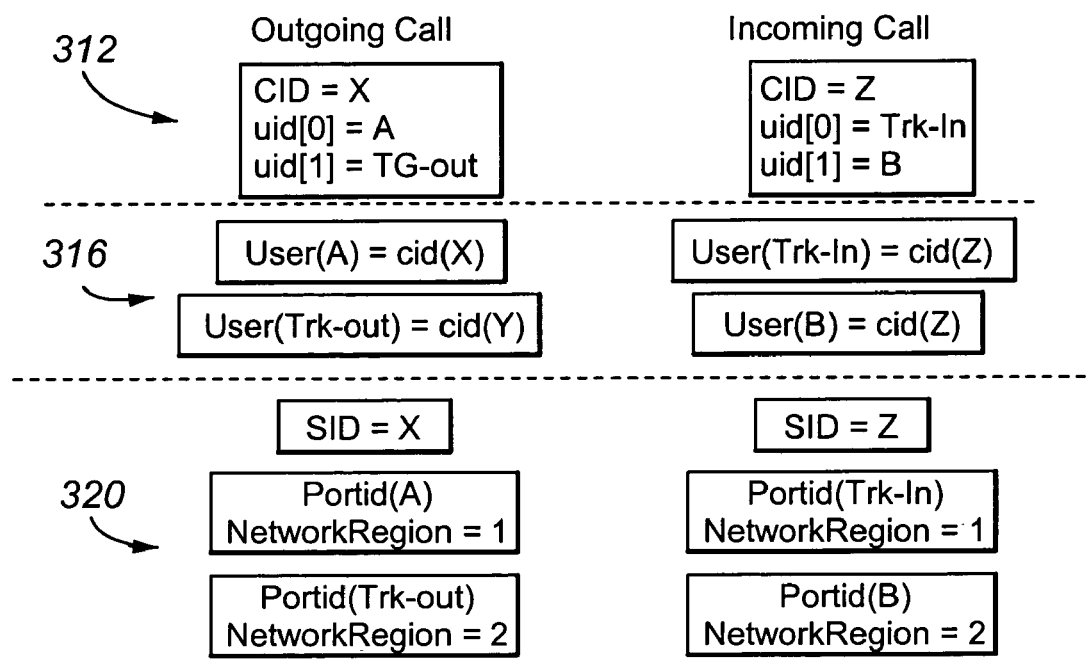
FIG. 3B is a block diagram of the data structures associated with an IGAR network fragmentation call.

FIG. 3B depicts the data structures for the call components in an IGAR network fragmentation call. Unlike the three call components of FIG. 3A, there are only two call components for a network fragmentation call, namely the outgoing and incoming calls. No phantom users are employed in the data structures. Rather, user identifiers for A and B are employed. "Y" is the call identifier for the outgoing IGAR call from the first subscriber at the first gateway to the outgoing trunk "TG-out" extending from the first gateway, and "Z" is the call identifier for the incoming IGAR call from the first network region to the incoming trunk "Trk-In" into the second gateway. The acronyms are otherwise the same as those in FIG. 3A.

Figure 4:
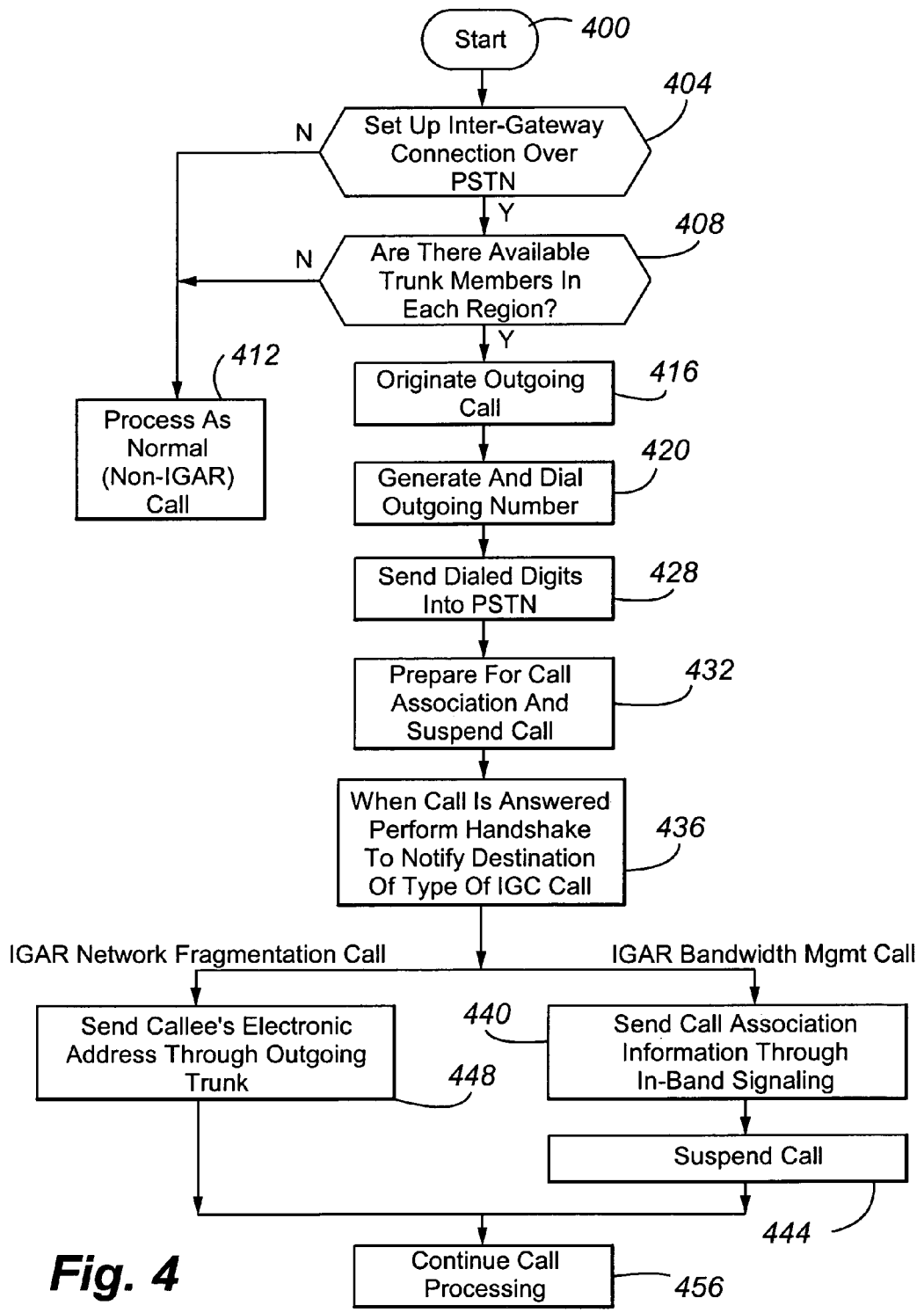
FIG. 4 is a flowchart depicting an operational embodiment of the inter-gateway routing agent.
Figure 5:
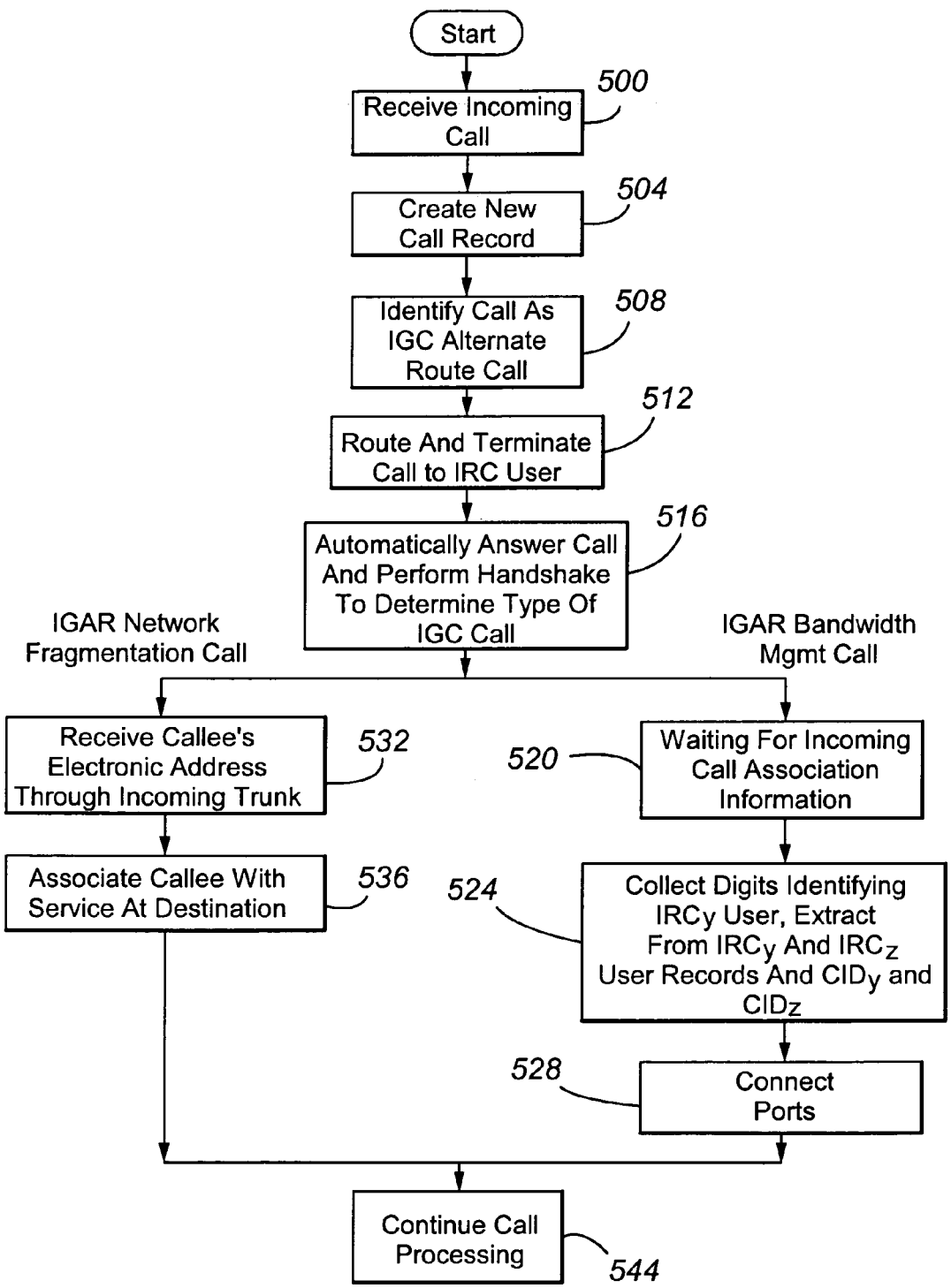
FIG. 5 is a flowchart depicting another operational embodiment of the inter-gateway routing agent.

Turning now to FIGS. 3-5, the operation of the agent 260 will now be described for both bandwidth management and network fragmentation calls.

In step 400, the call controller 256, such as in response to the dialing of a subscriber's Direct Inward Dialing or DID number associated with a digital station 232a in the second region 206, receives a new port connect request for an existing service "SID=X" and determines in decision diamond 404, that an IGAR connection is required to connect the new port (Portid(B)) to the other port (portid(A)) in the service. The determination to initiate an IGAR connection may be for any of the reasons noted above, such as when the primary media server loses control of the second gateway 224 due to component and/or WAN link failure. Even when a WAN link failure has occurred, the primary media server 200 may still determine not to initiate an IGAR connection but rather continue with a WAN connection when the failure has not caused the primary server to lose control of the media gateway serving the calling and the called subscriber station, the media gateway of the called subscriber has not yet become unregistered, and/or an LDN extension does not exist for the network region of the called subscriber. The controller 256 makes an IGAR request to the agent 260 indicating the identifiers of the two network regions which need to be connected with trunk facilities. The request typically includes an IGAR call identifier, IGAR call-type identifier, the port index and system identifier of port(B), the source gateway identifier (of port B) and destination gateway identifier (or port A). The network, gateway, IGAR, and IGAR call-type identifiers can be any numerical, alphabetical, or alphanumerical variable or collection of variables that is unique with respect to other identifiers of the same type.

In decision diamond 408, the agent 260 determines whether there are available (local) trunk members in each region. If there are (local) insufficient trunk members in each region, the agent 260 rejects the request. In that event or in decision diamond 404 if no inter-gateway connection is required, the call controller 256 proceeds with conventional processing of the call. In the event that there are sufficient (local) trunk members in each region, the agent 260 proceeds to step 416. "Local" means a trunk within a selected or interconnected network region serving the calling subscriber (but not necessarily on the same media gateway that is servicing the calling subscriber's station).

In step 416, the agent 260 originates an outgoing call. For an IGAR bandwidth management call, the call is originated by the phantom IGAR user (IRC-Y), and, for an IGAR network fragmentation call, the call is originated by subscriber A. The IGAR user is typically identified by a table index of user IRC=Y. The call controller 256 receives the IGAR call origination and a new call record/call record for the IGAR call is created (i.e., CID=Y and SID=Y) as shown in FIGS. 3A and 3B.

In step 420, the agent 260 constructs and dials a public network number that will route through the PSTN trunking network and terminate at a trunk in the second network region. The agent first selects and seizes a trunk by making a series of passes through the members of a trunk group. The first pass searches for a member in the originator's gateway. If the first pass is unsuccessful, the second pass looks for members not in the originator's gateway but still in the originator's network region. If the first and second passes are unsuccessful, the third pass selects a trunk from another network region. As will be appreciated, a trunk may be taken from another network region if that network region is still connected and accessible to the originating network region.

In step 428, the dialed digits are sent into the PSTN 248, and the call controller 254 adds the selected trunk "TG-Out" to the service SID=Y for an IGAR bandwidth management call and to the service SID=X for an IGAR network fragmentation call.

The agent 260, in step 432, prepares for IGAR call association and suspends the call. Upon successful trunk termination on CID=Y for an IGAR bandwidth management call and on CID=X for an IGAR network fragmentation call, the agent 260 requests digit collection resources for the Dual Tone MultiFrequency or DTMF digits to be forwarded by the second gateway in connection with the IGAR call.

In FIG. 5, the second gateway 224 receives the incoming IGAR call in step 500. The second gateway notifies the controlling media server (whether the primary or spare media server) of the incoming call information.

In step 504, the controlling media server performs normal call processing on the incoming call and creates a new call record (CID=Z and SID=Z) for an IGAR bandwidth management call and CID=Z for an IGAR network fragmentation call. Until the digits are analyzed, the controlling media server is not aware that this is an incoming IGAR call. Accordingly, the data structures initially created are those normally created for an incoming call.

In step 508, the incoming IGAR call digits are collected, provided to the controlling media server, and mapped by the controlling media server to the IGAR LDN corresponding to the second network region. The call is now recognized by the controlling media server as an incoming IGAR call.

In step 512, the call is routed and termed by the controlling media server to a selected phantom IGAR user ("IRTE/1"). Because the type of IGAR call is as yet unknown by the second gateway 224 and/or spare media server 228, the data structures of FIG. 3B for the incoming call have a phantom IGAR user substituted for user B.

In step 516, the incoming trunk call is automatically answered by the second gateway 224 and its controlling media server. After the trunk is cut-through, a handshake involving bi-directional DTMF transmission occurs to determine the type of IGAR call. For both types of IGAR calls and when the call is answered, the controlling media server (whether the primary media server 200 for a bandwidth management IGAR call or the spare media server 228 for a network fragmentation IGAR call) instructs the second gateway to repeatedly end-to-end signal a digit or collection of digits to indicate answer back to the first gateway. In one configuration, the controlling media server instructs the second gateway 224 to attach TTR to the digit(s) to determine the type of IGAR call.

The further process for an IGAR bandwidth management call is now discussed with reference to steps 520-528 and 440-444. In step 520, the primary media server suspends call processing on CID=Z when receipt of the digit(s) is acknowledged and waits for the incoming call association information. In step 440, when the digit is recognized by the primary media server, the first gateway end-to-end in-band signals a series of digits back towards the incoming trunk and terminating user. The signals include identifiers for the type of IGAR call and the IRC=Y user. In step 444, the primary media server then suspends call processing on CID=Y. In step 524, the digits are collected identifying the IRC=Y user and passed by the primary media server to the IRC=Y user or agent 260. The agent 260 extracts CID=Y and CID=Z and informs the call controller that CID=Y and CID=Z contain the two inter-region trunk ports that satisfy the IGAR request. In step 528, the call controller, in step 528, finds the two trunk ports, one in each service, and connects port A with trunk Y and port B with trunk Z.

The further process for an IGAR network fragmentation call is now discussed with reference to steps 532-536 and 448-452. The spare media server 228 suspends call processing on CID=Z when receipt of the digit(s) is acknowledged by the primary server 200 and waits for the incoming call association information from the first region 202. In step 448, when the digit(s) is recognized by the primary media server 200 in the first region, the first gateway is instructed to in-band signal a series of digits back toward the incoming trunk and terminating user. The series of digits include identifiers for the type of IGAR call and user B (e.g., user B's extension). In step 524, the digits are collected identifying user B and normal call processing for a PSTN call thereafter occurs.

In step 544, further call processing is continued on either type of IGAR call using conventional techniques.

Call processing for the network fragmentation-type IGAR call may be performed by any suitable technique. In one configuration, the first gateway 200 connects the trunk to the station of the calling subscriber (user A) and updates the station's display (e.g., populates the display with the name of the called subscriber and the called subscriber's number). When the spare media server 228 receives the incoming call association information, the second gateway 224 connects the trunk to the station of the called subscriber (user B), alerts the digital station 232 of the called subscriber, and updates the station's display (e.g., populates the display with the name of the calling subscriber and the calling subscriber's number). When the called subscriber answers, a voice connection is cut through the trunk from the calling subscriber's station 204 to the called subscriber's station 232. The spare media server 228 can notify the primary media server 200 that the called subscriber has answered the call by in-band signaling selected digits to the first gateway 220. As will be appreciated, in a normal trunk call ringback and ring tones are played on the incoming side to the trunk and are turned off when the called party answers. With a station call, ringback and ring tones are played on the originating side. In a network fragmentation application involving two controlling servers the originating side does not know when the destination side answers because the trunk call has already been answered. This problem is overcome by the primary media server 200 (or the originating media server) playing ringback to the calling subscriber's station 204 and the spare media server 228 playing ring tones on the called subscriber's station to permit the further exchange of in-band signals between the first and second gateways after ringback tones have commenced. In this manner, the calling subscriber will not hear the further in-band signaling tones. Normal call coverage techniques can also be performed. For example when the called subscriber's voice mail server is located in the called network region, the media server in the called network region can direct the IGAR call to the voice mail server when the called subscriber fails to answer.

A variety of signals may be transmitted in-band between the primary and spare media servers in connection with the call to provide feature transparency (e.g., to permit displays to be populated with call-related information). Generally, the in-band signaling supports at least exchanging information for the calling and called subscribers' displays and indicating the desired ring pattern. For example and as noted above, the primary server 200 can provide digits indicating the identity of user A (e.g., user A's name and/or extension) so that user B's station can be updated properly as if no network fragmentation had occurred. Other features may be supported. Examples include distinctive ringing, a reason code (e.g., indicating the reason that the call is coming in, such as call being a priority call, a forwarded call, a call coverage call, and the like), call coverage, inward and/or outward call restrictions, class of restrictions, busy indicator or tone, busy verification (when a station seeks to busy-verify another station), call forwarding, call parking, call pickup, conferencing, crisis alert, emergency call to a provider (e.g., Public Safety Access Point), group paging, calls to hunt groups, intercom calls, last number dialed button, leave word calling, listed directory number, loudspeaker paging, malicious call trace, meet-me conference, message retrieval, off-premise station, paging, personal station access, priority calling, security violation notification, send all calls, remote send all calls, service observing, single digit dialing, station lock, station security code, voice coverage message retrieval, voice principal message retrieval, terminating extension group, transfer, voice messaging, and whisper paging. Preferably, the signaling supports at least the calling number, the reason code associated with the call, and distinctive ringing.

To prevent users from adversely reacting to a set of displayed information different than the set of information normally displayed in a WAN call, a reason code can be displayed on the calling and called user's stations indicating that the call is an IGAR call. The reason code may further distinguish between bandwidth management and network fragmentation type calls.

In one configuration, call-related information is sent not only by the calling network region to the called network region but also from the called network region to the calling network region. For example when the voice mail server is located in the calling party's network region, the controlling media server in the calling party's network region can determine that the called subscriber has not answered his phone within a selected number of rings or within a selected time interval and can direct the calling subscriber's call to the local voice mail server. The controlling server in the called party's network region can in-band or out-of-band convey to the controlling server in the calling party's network a flag or other indicator that the called subscriber has failed to answer. The in-band signaling is done over the previously selected and established IGAR trunk as a voice path has not been cut through the trunk. The out-of-band signaling can be done using a second IGAR trunk as set forth in connection with the bandwidth management call.

Because the IGAR network fragmentation-type call uses trunks and end-to-end signaling which can delay call set up, call setup times are preferably made faster by using faster trunks. ISDN trunks are the speediest because digital call setup messaging is fast and because the end-to-end signaling timers for ISDN trunks are very short.

As will be appreciated, when the primary server regains control of the components in the second network region IGAR network fragmentation type calls are no longer used. The resumption of control by the primary server can be readily and automatically detected by a successful resumption of the heartbeat or polling mechanism; that is, the resumption of control is detected by the gateways in the various network fragments responding to heartbeat or polling signals and/or registering with the primary media server.

A number of variations and modifications of the invention can be used. It would be possible to provide for some features of the invention without providing others.

For example in one alternative embodiment, an LDN is assigned to each circuit-switched trunk connected to a selected network region. Although this configuration would simplify call association, it requires the enterprise to purchase a much larger number of public network numbers, which can be expensive. Additionally, certain resources, such as a music-on-hold and/or announcement resource, do not have a public addressable extension.

In yet another embodiment, the IGAR call is sent to voice mail when the called subscriber fails to answer and when the called subscriber's voice mail server is located in a different network region. Additional in-band signaling is used to route the call to voice mail. For example, when the controlling server of the calling or called party's gateway/station determines that voice mail is unreachable (e.g., the voice mail server is in a network region other than the network regions of the called or calling stations and the network region is under the control of a spare media server), the server can initiate an IGAR call to the network region of the voice mail server. The initiating media server can in-band signal the voice mail extension digits to the media server controlling the gateway of the network region containing the voice mail server. The call thus arrives at the voice mail server as an incoming PSTN call.

In another alternative embodiment, the first media server calls the second media server and then attaches a Touch Tone Receiver, waiting for the second media server to answer. When the second network region answers, the second media server immediately signals the (typically unique) identifier to the first media server. The second media server repeats the transmission a selected number of times in case the digits are lost in prior attempts. The identifier is encoded specially to ensure that the first media server can be confident that it has received a complete and correct identifier. For example, the identifier can be encoded in "octal" and use the digit "9" as a delimiter. In this case, the first media server does not reply but simply begins to use the trunk call as a bearer channel after the unique identifier is verified to be valid.

In yet another embodiment, in-band signaling is performed by exchanging packets. The packet payload includes the information to be transmitted between the communication devices. The packet payload may be in the form of digitized DTMF tones.

In yet another embodiment, the present invention is not restricted to a single distributed enterprise network but may be employed by media servers of different enterprises provided appropriate translation information is available at each end of the communication.

In yet another embodiment, the logic described above may be implemented as software, a logic circuit, or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for effecting a communication between subscribers of an enterprise network, comprising:
   (a) providing an enterprise network having geographically dislocated first and second network regions, wherein the first and second network regions are in communication with one another through first and second intermediate networks and respectively comprise first and second gateways and a plurality of communication devices, and wherein, in a first operational mode, the first and second network regions are controlled by a common media server and bearer channels for at least substantially real-time communications are routed over the first intermediate network and wherein, in a second operational mode, the first and second network regions are not controlled by a common media server;
   (b) receiving, by the first network region and from a first communication device of a first subscriber located in the first network region, a request to initiate an at least substantially real-time communication with a second communication device of a second subscriber located in the second network region;
   (c) determining, by the first network region, that the enterprise network is in the second operational mode;
   (d) originating an outgoing communication to a selected electronic address, the selected electronic address routing through the second intermediate network and terminating at the second network region, wherein the selected electronic address is not associated with a particular subscriber in the second network region; and
   (e) after the outgoing communication is answered by the second network region, forwarding, over the second intermediate network, a unique identifier of at least one of the second subscriber and the second communication device.

2. The method of claim 1, wherein the first operational mode is in existence when the media server is able to communicate with each of the first and second network regions over the first intermediate network, wherein the second operational mode is in existence when the media server is unable to communicate with each of the first and second network regions over the first intermediate network, and wherein in the first operational mode at least most of the bearer channels for the at least substantially real time communications are routed over the first intermediate network and not over the second intermediate network.

3. The method of claim 1, wherein the common media server is a primary media server, wherein the second network region comprises a spare media server, wherein, in the second operational mode, the second network region is under the control of the spare media server, wherein the enterprise network comprises first and second groupings of trunks connected to the second intermediate network, wherein each of the first and second groupings of trunks comprise a plurality of trunks, and wherein the selected electronic address is associated with the second grouping of trunks and wherein step (d) comprises the substep:
   (d1) transmitting, by the first network region, the selected electronic address over the second intermediate network to the second network region in an outgoing communication; and wherein step (e) comprises the substep
   (e1) after the outgoing communication is answered by the second network region, transmitting, by the first network region to the second network region, over the second intermediate network, and in band with the outgoing communication, the unique identifier, wherein the unique identifier is used to establish the communication of the first subscriber with the second subscriber.

4. The method of claim 3, wherein the unique identifier is a second user identifier associated with the second subscriber, wherein the selected electronic address is a telephone number, wherein the substantially real-time communication is a live voice call, wherein a first communication-related data structure is associated by the second network region with the incoming communication from the first network region, wherein a second communication-related data structure is associated by the first network region with the outgoing communication, wherein the first communication-related data structure includes a telephone number of the second communication device, a first user identifier, and an identifier of a first outgoing trunk, and wherein the second communication-related data structure includes the telephone number of the second communication device, a second user identifier, and an identifier of a second incoming trunk.

5. The method of claim 4, further comprising:
(f) determining that the second subscriber has failed to answer the second communication device in response to the incoming communication from the first subscriber;
(g) determining that a voice mail server is located in the first network region; and
(h) the second network region in-band signaling the first network region that the second subscriber has not answered the incoming communication; and
(i) the first network region directing the communication from the first subscriber to the voice mail server to leave a voice message for the second subscriber.

6. The method of claim 3, wherein the identifier is a user identifier associated with at least one of the second user and a phantom user and wherein step (d) comprises the substep:
(d2) transmitting, in-band, a communication-type identifier indicating whether the communication is a network fragmentation-type call or a bandwidth management-type call, wherein, when the communication-type identifier indicates a network fragmentation-type call, the user identifier is associated with the second user and, when the communication-type identifier indicates a bandwidth management-type call, the user identifier is associated with the phantom user.

7. The method of claim 3, wherein the first network region comprises a first plurality of subscribers and the second network region comprises a different second plurality of subscribers and further comprising:
(e) establishing a plurality of simultaneous bearer connections over the second intermediate network between members of the first and second pluralities of subscribers, wherein the plurality of bearer connections term to the selected electronic address.

8. The method of claim 7, further comprising, after termination of the communication between the first and second subscribers:
caching a trunk connection between first and second gateways in the first and second network regions, respectively, the trunk connection having been used during the communication.

9. The method of claim 3, further comprising:
at least one of the first and second network regions transmitting in-band feature information regarding at least one selected feature; and
in response the other of the at least one of the first and second network regions implementing the selected feature.

10. The method of claim 9, wherein the selected feature is one or more of a calling electronic address of the first subscriber, an identifier of the first subscriber, a distinctive ringing indicator, a reason code, a call restriction, and a class of call restriction.

11. The method of claim 3, further comprising:
maintaining the outgoing communication channel between the first and second network regions after hang up by the first and second subscribers.

12. The method of claim 1, further comprising:
(f) the first network region playing ringback tones over the first communication device; and
(g) during step (f), at least one of the first and second network regions in-band signaling further contact-related information to the other of the first and second network regions.

13. In an enterprise network having geographically dislocated first and second network regions, wherein the first and second network regions are in communication with one another through first and second intermediate networks, wherein the first network region comprises a first gateway, a first media server, and a plurality of communication devices, wherein the second network region comprises a second gateway and a voice mail server, wherein each of the first and second intermediate networks has a corresponding unique telephone number, each of the telephone numbers being associated with a plurality of subscribers, and wherein, in a first operational mode, the first and second network regions are controlled by the first media server and at least most of the bearer channels for live voice communications are routed over the first intermediate network and wherein, in a second operational mode, the first media sever does not control the second network region, a method comprising:
(a) determining, by the first network region, that call coverage requires a contact from a first communication device to be directed to the voice mail server to permit the user of the first communication device to leave a voice message for a subscriber;
(b) determining, by the first network region, that the enterprise network is in the second operational mode;
(c) initiating, by the first network region and over the second intermediate network, a call to the unique telephone number corresponding to the second network region;
(d) upon successful termination of the call on the second network region, in-band signaling, over a channel of the call, an identifier of the voice mail server; and
(e) thereafter connecting, over the call channel, the first communication device with the voice mail server.

14. The method of claim 13, wherein the first operational mode is in existence when the media server is able to communicate with each of the first and second network regions over the first intermediate network, wherein the second operational mode is in existence when the media server is unable to communicate with each of the first and second network regions over the first intermediate network, wherein in the first operational mode at least most of the bearer channels for the at least substantially real time communications are routed over the first intermediate network and not over the second intermediate network, and wherein in the second operational mode at least most of the bearer channels for the at least substantially real time communications are routed over the second intermediate network.

15. The method of claim 13, wherein the first media server is a primary media server, wherein the second network region comprises a spare media server, wherein, in the second operational mode, the first network region is under the control of the primary media server and the second network region is under the control of the spare media server, wherein the enterprise network comprises first and second groupings of trunks connected to the second intermediate network, wherein each of the first and second groupings of trunks comprise a plurality of trunks, and wherein the unique telephone number associated with the second network region is associated with the second grouping of trunks.

16. An enterprise network, comprising:
(a) a first network region geographically dislocated from a second network region, wherein the first and second network regions are in communication with one another through first and second intermediate networks;
(b) a first gateway in the first network region, wherein the second network region comprises a second gateway;
(c) a first plurality of communication devices in the first network region, wherein the second network region comprises a second plurality of communication devices;
(d) a primary media server operable to control the first and second network regions in a first operational mode but not in a second operational mode; wherein bearer channels for at least substantially real-time communications are routed over the first intermediate network; and
(e) an inter-gateway routing agent operable, in the second operable mode and in response to a request, by a first communication device of a first subscriber in the first network region, to set up a call with a second communication device of a second subscriber in the second network region, (i) to set up a call, over the second intermediate network, to a second telephone address, the second telephone address being associated generally with the second network region and not with a particular subscriber, and (ii) to transmit over a channel of the call a unique identifier associated with at least one of the second communication device and second subscriber.

17. The enterprise network of claim 16, wherein the first intermediate network is packet-switched and the second intermediate network is circuit-switched, wherein the second telephone address is associated with a plurality of trunks in communication with the second network region, and wherein the call channel extends between the first and second gateways, and wherein the first communication device is not alerted until the call is set up between the first and second gateways.

18. The network of claim 16, wherein the first operational mode is in existence when the primary media server is able to communicate with each of the first and second network regions over the first intermediate network, wherein the second operational mode is in existence when the primary media server is unable to communicate with each of the first and second network regions over the first intermediate network, wherein, in the first operational mode, at least most of the bearer channels for calls between the first and second network regions are routed over the first intermediate network and not over the second intermediate network, and wherein, in the second operational mode, at least most of the bearer channels for calls between the first and second network regions are routed over the second intermediate network and not over the first intermediate network.

19. The network of claim 16, wherein the second network region comprises a spare media server, wherein, in the second operational mode, the second network region is under the control of the spare media server, wherein the enterprise network comprises first and second groupings of trunks connected to the second intermediate network, wherein each of the first and second groupings of trunks comprise a plurality of trunks, and wherein the second telephone address is associated with the second grouping of trunks, and wherein the inter-gateway routing agent transmits the second telephone address over the second intermediate network to the second network region in during call set up and, after the call is set up with the second network region, the inter-gateway routing agent transmits to the second network region, over the second intermediate network and in band with the call channel the unique identifier, wherein the unique identifier is used to establish the communication between the first and second subscribers over the call channel.

20. The network of claim 19, wherein the unique identifier is a second user identifier associated with the second subscriber, wherein the second telephone address is a telephone number, wherein the call is a live voice call, wherein a first communication-related data structure is associated by the first network region with call, wherein a second communication-related data structure is associated by the second network region with the call, wherein the first communication-related data structure includes the second telephone number of the second communication device, a first user identifier of the first subscriber, an identifier of a first outgoing trunk, and wherein the second communication-related data structure includes the second telephone number of the second communication device, the second user identifier, and an identifier of a second incoming trunk.

21. The network of claim 20, wherein the second network region determines that the second subscriber has failed to answer the second communication device in response to the incoming communication from the first subscriber, wherein the second region determines that a voice mail server is located in the first network region, wherein the second network region in-band signals, over the call channel, the first network region that the second subscriber has not answered the incoming communication, and wherein the first network region directs the communication from the first subscriber to the voice mail server to leave a voice message for the second subscriber.

22. The network of claim 19, wherein the unique identifier is a user identifier associated with at least one of the second subscriber and a phantom user and wherein the first gateway transmits in-band a communication-type identifier indicating whether the communication is a network fragmentation-type call or a bandwidth management-type call, wherein, when the communication-type identifier indicates a network fragmentation-type call, the user identifier is associated with the second subscriber and, when the communication-type identifier indicates a bandwidth management-type call, the user identifier is associated with the phantom user.

23. The network of claim 16, wherein at least one of the first and second gateways transmits in-band feature information regarding at least one selected feature; and, in response the receiving network region implements the selected feature.

24. The network of claim 23, wherein the selected feature is one or more of a first telephone number of the first communication device of the first subscriber, an identifier of the first subscriber, a distinctive ringing indicator, a reason code, a call restriction, and a class of call restriction.

25. The network of claim 16, wherein the first network region plays ringback tones over the first communication device; wherein, while ringback tones are played, at least one of the first and second gateways in-band signals further contact-related information to the other of the first and second network regions.

26. An enterprise network, comprising:
(a) a first network region geographically dislocated from a second network region, wherein the first and second network regions are in communication with one another through first and second intermediate networks;

(b) a first gateway in the first network region, the first gateway being in communication with a second gateway in the second network region;

(c) a first plurality of communication devices in the first network region, the first plurality of communication devices being in communication with a second plurality of communication devices in the second network region;

(d) an inter-gateway routing agent operable to: (i) determine, in response to a request, by a first communication device of a first subscriber in the first network region, to set up a call with a second communication device of a second subscriber in the second network region, that, due to a predetermined condition, the call must be set up over the second intermediate network and not the first intermediate network, wherein the predetermined condition is at least one of a desired quality and/or grade of service is currently not available over the first intermediate network and a primary media server in the first network region has lost control of the second network region, (ii) to set up a call, over the second intermediate network, to a second telephone address, the second telephone address being associated generally with the second network region and not with a particular subscriber, and (iii) to transmit over a channel of the call a unique identifier associated with at least one of the second communication device and second subscriber.

27. The enterprise network of claim 26, wherein the first intermediate network is packet-switched and the second intermediate network is circuit-switched, wherein the second telephone address is associated with a plurality of trunks in communication with the second network region, wherein the call channel extends between the first and second gateways, wherein the first communication device is not alerted until the call is set up between the first and second gateways, and wherein the inter-gateway routing agent sends over the call channel an identifier of the predetermined condition as being one of a desired quality and/or grade of service is currently not available over the first intermediate network and a primary media server in the first network region has lost control over the second network region.

28. The enterprise network of claim 26, wherein the predetermined condition is a desired quality and/or grade of service is currently not available over the first intermediate network, wherein a bearer channel of the call is over the second intermediate network and a signaling channel for the call is over the first intermediate network, and wherein a set of data structures defining the call uses a first phantom user as the originator of the call and a second phantom user as the destination of the call.

29. The enterprise network of claim 28, wherein the predetermined condition is deemed to exist when at least one of the following is true: a number of calls allocated by call admission control has been reached, a bandwidth allocated by call admission control has been reached, Voice over Internet Protocol resource exhaustion in the first and/or second gateway occurs, a codec set between the first and second network regions is not specified, and forced redirection between the first and second network regions is in effect.

30. The enterprise network of claim 29, wherein the primary media server plays ringback on the first subscriber communication device and ring tones on the second subscriber communication device.

31. The enterprise network of claim 26, wherein the predetermined condition is a primary media server in the first network region has lost control over the second network region, wherein a secondary media server now controls the second network region, wherein both bearer and signaling channels for the call are over the second intermediate network, and wherein a set of data structures defining the call uses a first user identifier of the first subscriber as the originator and a second user identifier of the second subscriber as the destination.

32. The enterprise network of claim 31, wherein the primary media server plays ringback to the first subscriber communication device and wherein the secondary media server plays ring tones on the second subscriber communication device.

33. The enterprise network of claim 26, wherein the inter-gateway routing agent caches inter-gateway connections, wherein the agent determines that there are available local trunk members in the first network region, and wherein the agent in-band signals over the call channel identifiers for a type of predetermined condition and a user identifier.

34. The enterprise network of claim 33, wherein the agent identifies, as part of the call channel, a first port on the first gateway and a second port on the second gateway and connects the first port with a first trunk and the second port with a second trunk.

35. The enterprise network of claim 33, wherein, when a trunk is connected with a port on the first gateway, the first gateway connects a trunk the first communication device and updates the device's display to include a name of the second subscriber and a telephone number of the second communication device.

* * * * *

UNITED STATES PATENT AND TRADEMARK OFFICE
CERTIFICATE OF CORRECTION

PATENT NO. : 7,613,106 B2
APPLICATION NO. : 11/230355
DATED : November 3, 2009
INVENTOR(S) : Baldwin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this

Fourteenth Day of December, 2010

David J. Kappos
*Director of the United States Patent and Trademark Office*